Aug. 11, 1959      A. RYBA      2,899,036

SLIPRING-LESS ELECTROMAGNETICALLY ACTUATED COUPLING

Filed Aug. 29, 1956

INVENTOR.
ANTON RYBA
BY Hane and Nydick
ATTORNEYS

United States Patent Office 2,899,036
Patented Aug. 11, 1959

2,899,036

SLIPRING-LESS ELECTROMAGNETICALLY ACTUATED COUPLING

Anton Ryba, Bolzano, Italy, assignor of thirty percent to Joseph Reinisch and thirty percent to Ernst Vinatzer, both of Bolzano, Italy Application August 29, 1956, Serial No. 606,816

Claims priority, application Austria September 5, 1955

15 Claims. (Cl. 192—84)

The present invention relates to electromagnetically actuated couplings, said term referring to couplings in which magnetizable coupling components of the coupling are directly moved into and held in coupling engagement by an electromagnetic force and also to couplings in which mechanically engageable coupling members are moved into and held in engagement by the electromagnetic force. More particularly, the invention relates to electromagnetically actuated couplings which are connected to the source of current without the use of slip rings for supplying current to the coupling.

Slipring-less electromagnetically actuated couplings of the general kind above referred to, which employ a movable coupling member and a stationary coupling member, require bearings between the relatively movable members of the coupling that are highly accurate and substantially free of wear and tear. Unless such high quality bearings are provided, the air gap between the relatively moving coupling members does not remain constant and undesirable braking forces are generated between the rotating and the stationary coupling members. Furthermore, the structural design of slipring-less couplings as heretofore known, is rather complicated and limited to certain types of couplings.

One object of the present invention is to provide a novel and improved electromagnetically actuated coupling of the general kind above referred to, the structural design of which affords the advantages of a constant air gap having a minimum width and of great simplicity.

Another object of the present invention is to provide a novel and improved electromagnetically actuated coupling of the general kind above referred to in which the slipring-less current connections are independent of the type of bearing used for the stationary coupling member and of other factors such as wear and tear of the engaging coupling surfaces and magnetic leakage.

Still another object of the invention is to provide a novel and improved electromagnetically actuated coupling, the deisgn of which is free of the limitations in heretofore known designs and permits the use of slipring-less connections for practically all kinds of coupling designs.

A further object of the invention is to provide a novel and improved coupling design which affords the advantage of a reduction of the bearing area between the movable and the stationary coupling members.

Still a further object of the invention is to provide a novel and improved coupling design which permits neutralization of the unbalanced forces between the movable and the stationary coupling members by very simple means, such unbalanced forces being caused by the action of the magnetic leakage fields.

Other and further objects, features and advantages of the invention will be pointed out hereinafter and set forth in the appended claims forming part of the application.

In the accompanying drawings several preferred embodiments of the invention are shown by way of illustration and not by way of limitation.

Figure 1:
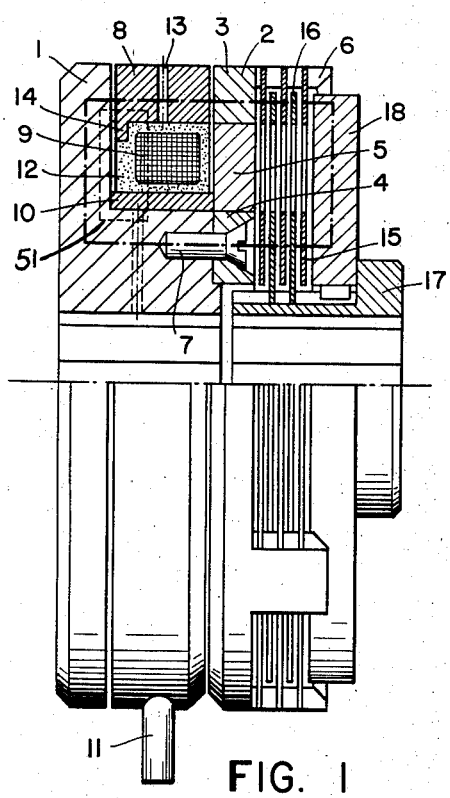
Fig. 1 is a sectional and elevational view of an electromagnetically actuated coupling according to the invention.
Figure 2:
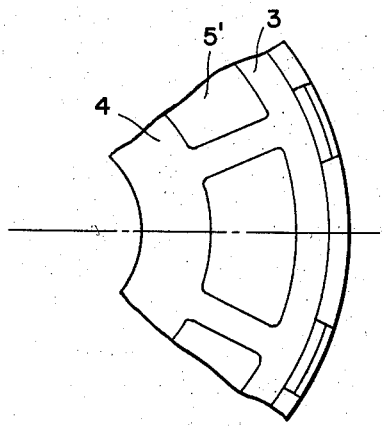
Fig. 2 is a fragmentary detail view of a modification of a part of the coupling.

Referring first to Figs. 1 and 2 in detail, the electromagnetically actuated coupling as shown in Fig. 1 comprises a magnet body including a rotary member with an L-shaped part 1 of ferromagnetic material and a disc shaped part 2. The latter part is formed of two radially spaced pole rings 3 and 4 and an intermediate ring 5. The pole rings are made of ferromagnetic material and the intermediate ring of non-magnetic material. Instead of providing a non-magnetic intermediate ring 5, the disc 2 may be solid and provided with window-like apertures 5' in the zone of the exciting coil more fully described hereinafter. In an arrangement of this kind, which is shown in Fig. 2, pole rings 3 and 4 are joined in effect by the circumferentially spaced ribs of ferromagnetic material. The two pole rings may also be joined by several separate ribs or spokes made of non-magnetic material. The outer ring 3 of disc 2 mounts carrier lugs 6 which may be secured to the ring, or integral therewith. Disc 2 is secured to part 1 of the magnet body by means of screws 7.

The stationary member of the magnet body of the coupling is formed of a ferromagnetic ring 8, an exciting coil 9 and a bearing ring 10. The stationary member of the magnet body is held stationary by suitable means indicated as a pin or bar 11. Coil 9 is embedded between ferromagnetic ring 8 and bearing ring 10 in a suitable hardened insulation mass 12 so that ring 8, coil 9 and bearing ring 10 constitute a structural unit.

One of the connections for the exciting coil is connected to mass and the other is guided through a bore 13 in ring 8 insulated therefrom. It is, of course, also possible to connect both conductors directly to the exciting coil, insulated from ring 8.

Ring 8 has an inwardly extending radial extension 14 which represents an increase in the cross-section of the ferro-magnetic material for the purpose of compensating for the increase in the density of the magnetic field due to a magnetic leakage field and of neutralizing one-sidedly acting magnetic forces between the rotary part and the stationary part of the magnet body. Extension 14 may be annular, or occupy only parts of the circumference. The extent of the required increase in the cross-section of the magnetic mass depends upon the extent of the occurring one-sidedly acting magnetic forces, that is, it is determined primarily by the magnitude of the leakage field.

The stationary part of the magnet body is journalled upon the rotary part thereof so that it has a minimum play in radial and axial direction.

The coupling components of the coupling are shown as coupling discs 15 which are secured to carrier lugs 6 by being fitted in slots of the same and inner coupling discs 16 which are fixedly secured to a coupling sleeve 17.

The coupling sleeve 17 and an axial center bore of coupling part 1 should be visualized as receiving the elements to be coupled such as two shafts.

Coupling discs 15 and 16 are designed as to shape and material in a manner conventional for couplings of the type here involved so that a detailed description of the coupling discs is not essential for the understanding of the invention. The coupling discs have preferably window-like openings in the zone of exciting coil 9 similar to the openings shown in Fig. 2 for pole rings 3 and 4.

The material for bearing 10 is preferably a material which has good running properties; materials of this kind are well known to the expert in the art. Instead of a bearing ring a suitable bearing such as a needle bearing may be employed. The bearing may be supplied with oil by providing appropriate lubrication holes in the base branch of coupling part 1.

The magnetic flux path formed by the respective ferromagnetic portions of parts 1, 2 and 8 is closed through an armature 18.

As appears from the previous description and Fig. 1, the coupling has a first rotary part of generally U-shaped cross-section including elements 1 and 2; a second rotary part including coupling sleeve 17; and a stationary part including element 8, the exciting coil 9 and bearing ring 10.

The function of the electromagnetically actuated coupling as hereinbefore described, is as follows:

Let is be assumed that coil 9 is energized. As a result, a magnetic field is generated as is indicated in Fig. 1 by dashed-dotted lines. The resulting forces of magnetic attraction press the coupling discs 15 and 16 against each other thereby coupling the coupling elements 17 and 1, 2. The thus coupled elements rotate whereas the ferromagnetic ring 8 and coil 9 remain stationary. As the inner walls of coupling elements 1, 2 are at a constant axial distance from the respective juxtaposed walls of stationary coupling part 8, the widths of the air gaps between the transitional surfaces for the magnetic flux, that is, the air gaps defined between the surfaces bounding the respective rotary and stationary elements remain constant independent from the other operations within the coupling.

In each magnetic circuit magnetic leakage fields are generated the pattern of which is controlled by the laws of the minimum magnetic resistance. The magnetic leakage lines close prematurely in accordance with the well understood phenomena of leakages across air-gaps as is indicated in Fig. 1 by a dashed line 51. These magnetic leakage lines distort the symmetry of the magnetic forces traversing the air-gaps between the stationary element 8 and the rotary elements 1 and 2 of the magnet body whereby one-sidedly acting magnetic forces are generated which produce an undesirable moment of loss as the stationary part of the coupling is held in position. If now the transitional cross-sections between the stationary part 8 and the rotary parts 1 and 2 of the magnet body, that is, the surfaces facing each other and defining the airgaps are equal and a constant useful flux is assumed, the number of the magnetic field lines at the transitional cross-sections on opposite surface of the airgaps is not equal since this number is increased on one side of part 8 by the number of the leakage flux lines. As a result, the density of the magnetic field is higher on one side of part 8 than would correspond to the useful flux. Consequently, the magnetic forces are non-symmetrical in the transitional cross-sections and one-sidedly acting magnetic forces occur between the stationary and the rotary elements of the magnet body. As is known, changes in magnetic cross-sections cause a linear change in the density of the magnetic field, whereas the magnetic force changes squarely with the density of the field. This phenomenon permits a convenient compensation of one-sidely acting forces and a restoration of the symmetry of the magnetic forces between stationary part 8 and rotary parts 1 and 2 by suitably dimensioning the respective cross-sections of parts 8 and 1, 2.

According to Fig. 1, such compensation and restoration are effected by increasing the transitional cross-section at the surfaces which are traversed by the major portion of the magnetic leakage field that is, the facing surfaces of part 8 and part 1. As before mentioned, the magnetic force changes with the square of the density of the magnetic field. Hence, a suitable increase in the facing transitional cross-section of parts 8 and 1 results in a reduction of the density of the field to an extent such that the equilibrium of the magnetic forces in the transitional cross-sections between the stationary part 8 and the rotary parts 1 and 2 of the magnet body is restored.

Preferably the magnetic force always decreases in the same direction. This can be conveniently attained by selecting the cross-section of rotary part 1 of the magnet body in relation to that of stationary part 8 so that a minimum of magneto-motive force (ampere turns) is consumed for this portion of the magnetic circuit.

Figure 3:
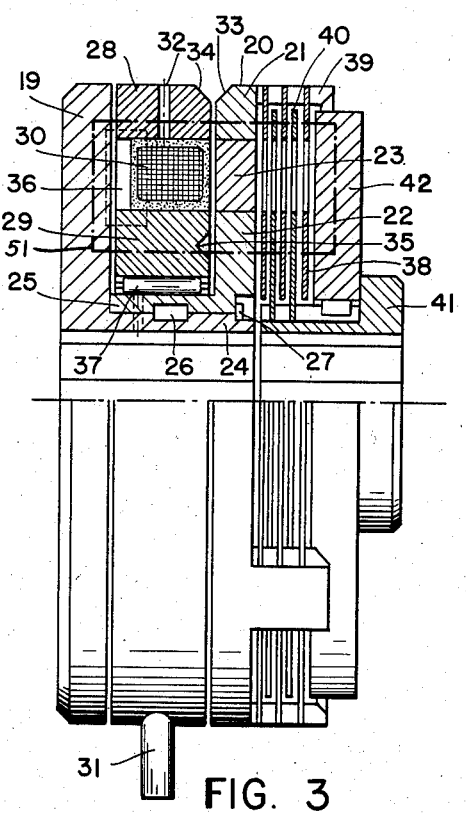
Fig. 3 is an elevational and sectional view of a modification of the coupling.

Fig. 3 shows an embodiment of another electromagnetically actuated coupling according to the invention in which the stationary part of the magnet body is so designed that the required bearing surface is reduced to a minimum and that the stationary part has a very simple design.

According to Fig. 3 the rotary part of the magnet body has again a generally U-shaped cross-section. It comprises a generally disc-shaped part 19 and a generally disc-shaped part 20. The latter part is composed of pole rings 21 and 22 joined by an intermediate ring 23. The pole rings are made of ferro-magnetic material and the intermediate ring of non-magnetic material. However, the intermediate ring 23 may be replaced by providing window-like openings in the otherwise solid disc 20 in a manner similar to that shown in Fig. 2. The two pole rings may also be joined by individual spokes or ribs preferably made of non-magnetic material. Discs 19 and 20 have axially extending flanges 24 and 25 which are seated upon each other. These flanges are secured against relative rotation by a key 26 and held against axial displacement by a circlip or spring washer 27. The axial length of flange 25 corresponds to the axial width of the stationary part of the magnet body plus the widths of the air gaps between the stationary part and the rotary part of the magnet body. As a result, the inner walls of discs 19 and 20 are held at a constant axial spacing from each other.

The stationary part of the magnet body comprises rings 28 and 29 between which is fitted an exciting coil 30 embedded in suitable hardened insulation material. Rings 28, 29 and coil 30 are held stationary by any suitable means indicated as a pin or rod 31.

One of the current connections for coil 30 is to mass and the other is connected to the coil through a bore 32 in ring 28. Of course, both connectors may be extended through ring 28, insulated therefrom.

Rings 28 and 21 which are both made of ferromagnetic material are formed with slanted edges 33 and 34 and ferromagnetic ring 29 has one or several annular grooves 35. The slanted edges and groove 35 serve to compensate for one-sidedly acting magnetic forces.

Figure 4:
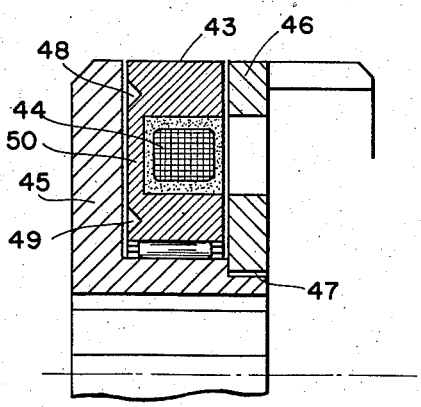
Fig. 4 is a fragmentary sectional view of a modification of another part of the coupling.

The ferromagnetic rings 28 and 29 as shown in Fig. 3 are individual separate rings which are joined by the insulation mass in which coil 30 is embedded. They may also be joined at 36 by radial ribs or spokes of the configuration shown in Fig. 2. It may further be advantageous to provide as stationary part a solid ring formed with an annular recess for receiving the exciting coil as shown in Fig. 4 and described in connection therewith. The back wall 36 of the groove for the exciting coil may then be provided with window-like openings of the kind shown in Fig. 2.

Rings 28 and 29 need not have an equal cross-section. For instance, the cross-section of the inner ring 29 may be materially different from that of the outer ring 28 and a portion of the magnetic flux may traverse through flanges 24 and 25.

The stationary part of the magnet body is fitted in the rotary part so that there is a minimum play in radial and axial direction. The two parts may be journalled within each other by any suitable bearing such as a needle bearing 37. The bearings may be lubricated through suitable bores in flanges 24 and 25 as is indicated in Fig. 3 by dashed lines.

Ring 21 mounts carrier lugs 39 to which are secured the outer coupling discs 38. The inner coupling discs 40 are secured in slots of a coupling sleeve 41. The coupling discs 38 and 40 are conventional as has been described in connection with Figs. 1.

The magnetic circuit is closed through an armature 42.

The two elements to be coupled should be visualized as being received by sleeve 41 and element 19.

The function of the coupling according to Fig. 3 is the same in respect to the transmission of the coupling forces as described in connection with Fig. 1, except that the entire base branch or web part of the rotary magnet body formed by longitudinal flanges extending from the side wall portions of elements 19 and 22 is in engagement with the stationary ring 29 by a bearing 37 only. This affords the advantage of reducing the bearing surfaces between the stationary and the rotary parts of the coupling.

The useful magnetic flux is indicated in Fig. 3 by a dashed-dotted line and the magnetic leakage field by a dashed line.

The compensation of one-sidedly acting magnetic forces between the stationary part and the rotary part of the magnet body is different in the coupling of Fig. 3 from that described for the coupling according to Fig. 1.

In Fig. 1 the one-sidedly acting magnetic forces are neutralized by increasing the transitional magnetic cross-section on the side traversed by the major portion of the leakage field. This side is indicated by the dashed field lines. The same effect can be obtained by reducing the transitional cross-section on the opposite side as is shown in Fig. 3. In one embodiment (Fig. 1) the density of the magnetic field is reduced by an increase of the cross-section whereas in the other embodiment (Fig. 3) the density of the field is increased by reducing the cross-section. In either arrangement, the one-sidedly acting forces are neutralized by the differences in the densities of the magnetic fields at the transitional cross-sections between the stationary part and the rotary part of the magnet body. Both arrangements may also be simultaneously applied.

Fig. 4 shows a modification in which the stationary part of the magnet body comprises a solid body 43 of ferromagnetic material in which is formed an annular recess for receiving the exciting coil 44. The rotary part of the magnet body comprises a member 45 of generally L-shaped cross-section and a disc 46. Disc 46 is similar to disc 2 of Fig. 1 and is screwed upon one arm of member 45 by means of a thread 47 and suitably secured against unscrewing. Annular grooves 48 and 49 serve to compensate one-sidedly acting magnetic forces. Stationary part 43 is journalled in rotary part 45, 46 with a minimum play in axial and rotary direction.

If the back wall 50 of the recess for coil 45 is kept solid, that is, if no window-openings are provided in this wall, or if windows are provided but ribs of ferromagnetic material of considerable cross-section are left, a portion of the magnetic flux will close within the stationary part of the magnet body similar to the flux path shown in Fig. 3 in dashed lines. Depending upon the percentage of the total flux represented by this partial flux, acting magnetic forces may occur which have the effect that there is a preponderance of the magnetic force between parts 43 and 45, that is, on the left side (as seen in the figure) rather than on the right side as has been described in connection with Figs. 1 and 3. A compensation of the forces of unbalance on the two sides of part 43 can be effected in such event by grooves 48, 49, slants, etc. on the transitional flanges opposite to those shown and described in connection with Figs. 1 and 3.

If it so happens that the premature closing of a portion of the magnetic flux through the stationary part of the magnet body just results in an equilibrium of the magnetic forces at the transitional cross-sections, changes in the cross-sections by the provision of grooves 48, 49, etc. may be omitted.

Generally, it may be said that if one-sidedly acting magnetic forces are compensated by reducing a cross-section this is effected at the transitional surfaces which show a minus relative to the equilibrium of the magnetic forces and if the compensation is achieved by an increase of a cross-sectional area this is effected at the transitional surfaces which show a plus in relation to the equilibrium of the magnetic forces.

The configuration and type of these changes in cross-section may take various forms. There may be provided for instance, several grooves or slants at both ferromagnetic rings, or the entire compensation may be concentrated on one ring only. The grooves or slants may be in the stationary part of the magnetic body only or in the rotary part or in both parts. Instead of annular grooves or slants, localized changes in cross-section may be employed for instance, radial notches or similar configurations. Broadly stated, the changes in cross-section either for purpose of increase or reduction of the field density may take any suitable shape within the scope of the invention.

The joining of the exciting coil with the associated ferromagnetic rings may be different from the illustrated embodiments without departing from the concept of the invention. For instance, the exciting coil may be completely or partly enveloped with metal preferably with a non-magnetic metal which is joined to the respective rings. The metal envelope of the coil may simultaneously serve as bearing for the respective part. The stationary part fitted upon the rotary part of the magnetic body as is shown in Fig. 1 may be journalled directly upon a suitable plastic without interposing a metal sleeve. It may be mentioned in this connection that for couplings without liquid lubrication the stationary part of the magnetic body may be journalled upon the rotary part by means of a bearing made of oil storing metal or one of the well known self-lubricating plastics.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An electromagnetically actuated slipring-less coupling for releasably coupling two components, said coupling comprising two movable coupling members each adapted to receive one of said components and a stationary magnet body, each of said movable coupling members including coupling means engageable one with the other in coupling engagement in response to an electromagnetic force, one of said movable coupling members including two generally disc shaped wall portions disposed in uniformly spaced relationship, said stationary magnet body being mounted between said disc shaped wall portions to define with each wall portion an air-gap of fixed and constant width, the movable coupling member having said disc shaped wall portions and the stationary magnet body forming a magnetic flux path transversely traversing the respective juxtaposed boundary surfaces of said two disc shaped wall portions, said airgaps and said stationary magnet body, and exciting means on the stationary magnet body energizable for generating a magnetic flux through said path to produce said electromagnetic force.

2. An electromagnetically actuated slipring-less coupling for releasably coupling two rotary components in alignment, said coupling comprising two rotary coupling members each adapted to receive one of said components, each of said coupling members including coupling means engageable one with the other in coupling engagement in response to an electromagnetic force, one of said coupling members forming a magnet element comprising a stationary magnet body and a rotary magnet body, said rotary magnet body forming a ring of generally U-shaped cross-section including a ring-shaped axially extending web part and two radially extending flanges, each of said flanges having an inner and an outer wall, the two inner walls of said flanges facing each other at uniform distances, said stationary magnet body being generally ring-shaped and having side walls facing said inner walls of said rotary magnet body, a ring-shaped exciting coil included in said stationary magnet body and bearing means disposed between said stationary magnet body and said rotary magnet body supporting said stationary magnet body on the web part of said rotary magnet body, said rotary magnet body and said stationary magnet body forming a magnetic flux path traversing said inner walls and the adjacent side walls of said stationary magnet body, each of said inner walls and the respective boundary wall of the stationary magnet body defining an air gap of uniform and fixed width disposed transversely of said path.

3. A coupling according to claim 2, wherein the flange of said U-shaped coupling member adjacent to the second rotary coupling member includes a ring portion of high magnetic resistance, said ring portion being disposed in juxtaposition with said exciting coil means in said stationary magnet body.

4. A coupling according to claim 2, wherein said stationary magnet body comprises a ring portion of ferromagnetic material mounting said exciting coil means and journalled about the web part of said U-shaped rotary magnet body.

5. A coupling according to claim 2, wherein said U-shaped rotary magnet body comprises two generally disc shaped ring elements forming the flanges of said body and axially extending joining means securing said elements in parallel relationship at a distance equal to the width of said stationary magnet body plus said air gap between the respective boundary walls of said stationary magnet body and said disc elements, said joining means constituting the web part of said U-shaped magnet body, and wherein said stationary magnet body comprises two radially spaced ferromagnetic ring portions, said exciting coil means being interposed between said ring portions.

6. A coupling according to claim 5, wherein one of said disc shaped elements is made of ferromagnetic material and the other of said elements is composed of a ferromagnetic ring portion and a ring portion of high magnetic resistance material disposed in juxtaposition to said exciting coil means.

7. A coupling according to claim 2, wherein the side branch of said U-shaped magnet body adjacent to said second rotary coupling member comprises two radially spaced ferromagnetic pole rings, and circumferentially spaced radial ribs joining said pole rings.

8. A coupling according to claim 2, wherein the side branch of said U-shaped magnet body adjacent to said second rotary coupling member comprises two radially spaced ferromagnetic pole rings and a ring of non-magnetic material interposed between said two pole rings for joining the same.

9. A coupling according to claim 2, wherein said stationary magnet body comprises two radially spaced rings of ferromagnetic material, said rings constituting part of said magnetic flux path, said coil means being disposed between said two rings, and circumferentially spaced radial ribs joining said two rings.

10. A coupling according to claim 2, wherein said stationary magnet body comprises a solid body of ferromagnetic material including an annular recess, said exciting coil means being disposed in said recess.

11. A coupling according to claim 2, wherein the juxtaposed boundary surfaces of the inner walls of the rotary magnet body and the stationary magnet body defining said magnetic flux path have cross-sectional areas different one from another, said difference in cross-sectional areas causing a difference in the density of the magnetic field at opposite sides of the stationary magnet body such as to compensate unbalanced magnetic forces acting upon the two magnet bodies.

12. A coupling according to claim 11, wherein juxtaposed boundary surfaces of the stationary magnet body and the rotary magnet body which cause a deficiency in the balance of the magnetic forces on one side of the stationary magnet body are reduced in area in respect to the respective juxtaposed boundary surfaces on the opposite side of the stationary magnet body.

13. A coupling according to claim 12 wherein the boundary surfaces reduced in area include circumferential recesses.

14. A coupling according to claim 11, wherein the juxtaposed boundary surfaces of the stationary magnet body and the rotary magnet body which cause an excess in the balance of the magnetic forces on one side of the stationary magnet body are increased in area in respect to the respective juxtaposed boundary surfaces on the opposite side of the stationary magnet body.

15. A coupling according to claim 14 wherein the boundary surfaces increased in area have a circumferential radially extending protrusion.

References Cited in the file of this patent

UNITED STATES PATENTS

| | | |
|---|---|---|
| 754,291 | Eastwood | Mar. 8, 1904 |
| 936,284 | Abernethy | Oct. 12, 1909 |
| 1,446,225 | Thompson | Feb. 20, 1923 |
| 1,622,261 | Payne | Mar. 22, 1927 |
| 2,375,783 | Gilfillan | May 15, 1945 |
| 2,465,601 | Ochtman | Mar. 29, 1949 |
| 2,549,214 | Lilja | Apr. 17, 1951 |
| 2,739,684 | Meyer | Mar. 27, 1956 |